June 2, 1931.  S. P. BURGESS  1,808,450

UNIVERSAL SHOE OR RECEIVING BOX FOR FURNACE WORK

Filed Jan. 19, 1928

Inventor
Samuel P. Burgess
By Mason Fenwick & Lawrence
Attorney

Patented June 2, 1931

1,808,450

UNITED STATES PATENT OFFICE

SAMUEL PAUL BURGESS, OF ROCK ISLAND, ILLINOIS, ASSIGNOR TO ROCK ISLAND REGISTER COMPANY, OF ROCK ISLAND, ILLINOIS

UNIVERSAL SHOE OR RECEIVING BOX FOR FURNACE WORK

Application filed January 19, 1928. Serial No. 247,974.

This invention relates to improvements in return shoes or boots or receiving boxes adapted for use in furnace work or any other suitable purpose.

An object of this invention is to provide a practical, frictionless universal shoe or receiving box which will function to greatly increase the efficiency of a heating plant by eliminating the air turbulence which is always present in return ducts old style shoe elements.

A further object of this invention is to provide a universal shoe or receiving box wherein the different angular forms of the shoes may be preserved and adjusted to any position from the vertical to the horizontal, thereby performing the duty of several shoes and tending to reduce materially the amount of stock required.

Another object of this invention is to provide a construction particularly adapted for return air shoes or receiving boxes for furnace work in which the stream line is so formed as to eliminate friction and thereby increase the velocity of air by avoiding the turbulence present in the type of shoe now in common use.

A further object of this invention is to provide an adjustable and reversible transition fitting of a round or rectangular metal conduit adapted for transmitting air for furnace purposes from one place to another and which are arranged in several angles from perpendicular to horizontal and obtuse angles right to left and left to right.

Further objects of this invention are to provide improved means whereby several angles in construction of return shoes or receiving boxes may be made by interchanging and adjusting any one or all members of the shoe or box and which will function to form the several angles from one fitting.

Other objects of this invention will appear from the following detailed description of the device and as disclosed in the single sheet of drawings, which is herewith made a part of this application.

In the drawings—

Figure 6:
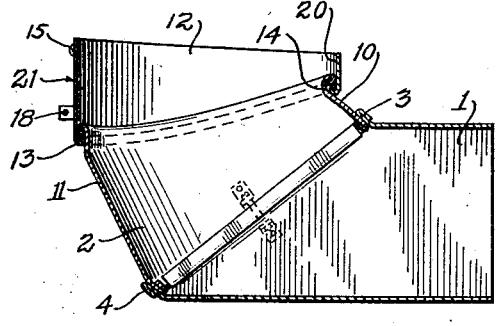
Figure 6 illustrates a sectional view of Figure 5 taken along line 6—6.
Figure 5:
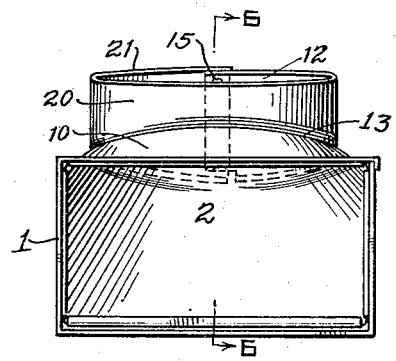
Figure 5 illustrates a front end view of the transition fitting, as disclosed in Figure 1.
Figure 1:
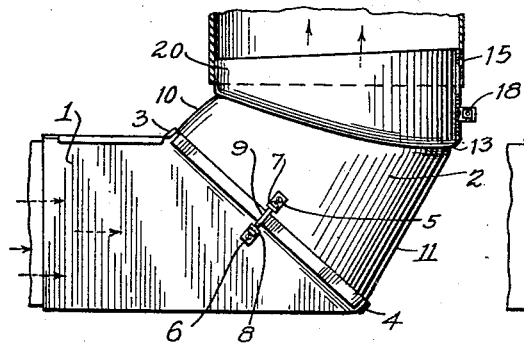
Figure 1 illustrates a side elevational view of the transition fitting having the two end elements at right angles to each other and the center member at an obtuse angle to the perpendicular members.
Figure 3:
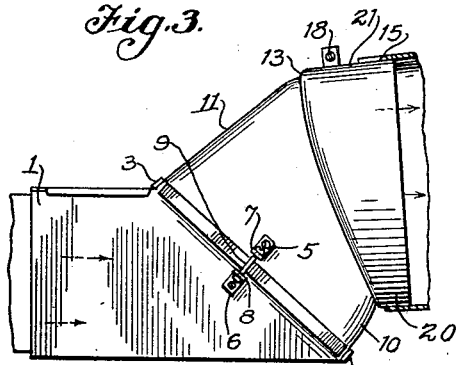
Figure 3 illustrates a side elevational view of a transition fitting disclosing the two end members arranged parallel to each other and the remaining member at an obtuse angle thereto.
Figure 4:
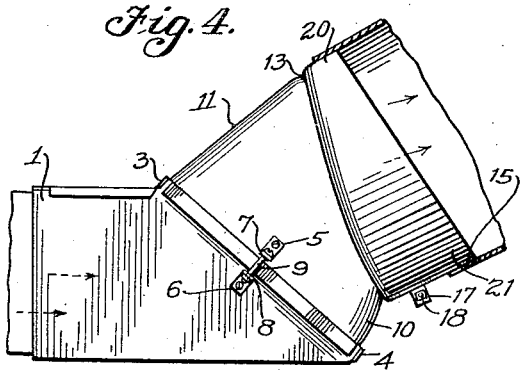
Figure 4 represents a side elevational view of Figure 3 disclosing one of the end members reversed in position, thereby bringing two of the members at an obtuse angle to the remaining member.
Figure 7:
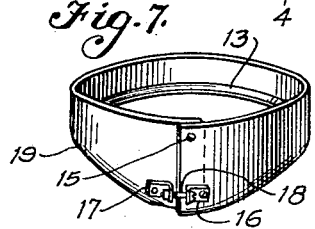
Figure 7 illustrates a perspective view of the collar element in the transition fitting disclosing the means for adjusting the collar element to the remaining sections of the fitting.

In the universal shoe or receiving box provided in this invention, numeral 1 designates a main member preferably formed in rectangular shape and made of any suitable material, such as sheet metal, commonly used in furnace work for air ducts and the like and having properly formed opening at one end for being brought into open communication with an intermediate member 2, which may also be made of any suitable material, such as sheet metal, the connecting edges 3 and 4 of the members 1 and 2 are preferably brought into overlapping relationship to each other and held in firm interlocked position by means of an adjustable device comprising bracket members 5 and 6 securely fastened to the members 2 and 1, the outwardly extending portions of the brackets 7 and 8 being provided with openings through which an adjustable screw and nut 9 may be extended. It is apparent that the sections 1 and 2 may be brought into firm interlocked relationship by means of tension screw 9 functioning in cooperation with the bracket portions 7 and 8, it being understood that section 2 is preferably constructed having its edge portion 4 of rectangular formation in order to connect properly with the main member 1, and, furthermore, section 2 is adapted to be reversed, as may be desired, in such a manner that the short side 10 and the longer side 11 may be positioned as clearly disclosed in Figures 1 and 3.

Figure 2:
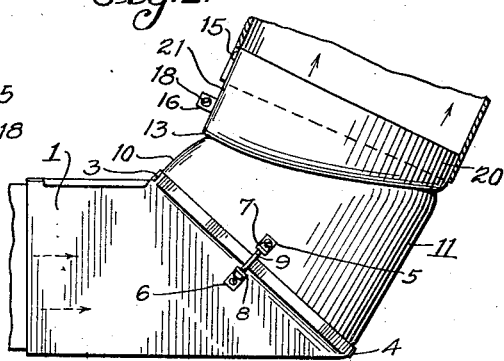
Figure 2 represents a side elevational view of Figure 1, disclosing an end member reversed in position, thereby bringing two of the members at an obtuse angle to the remaining member.

A collar section 12 is preferably made of sheet metal or other proper material and adapted to be adjustably and reversibly positioned in relationship to the members 1 and 2. The section 12 is formed round as one modification of this invention and formed preferably having an inwardly extending crimped bead portion 13 adapted to firmly interlock with an outward crimped bead portion 14 formed along the cooperating edge portion of the section 2. In forming the collar section 12, the two free ends are preferably held securely together near the upper edge by means of a rivet or other fastening element 15, the lower edge being adjustably held together by means of a clamping member consisting of bracket portions 16 and 17 securely fastened to the collar section 12 and a tension screw or clamping member 18, being cooperatively arranged in connection with the bracket portions in such a manner that the fitting edge 19 of the collar section 12 may be readily adjusted to the desired circumference for being received in connected and attached relationship with the member 2. Furthermore, the collar section 12 is arranged for reversing its short side 20 and long side 21, as clearly disclosed in Figures 1 and 2.

This invention provides an improved transition conduit consisting primarily of a plurality of sections capable of being adjusted to different positions in relation to each other, thus functioning to accomplish the result usually obtained by the use of several different structures of elements. It is readily apparent that a great reduction in the amount of stock on hand may be accomplished through the use of this invention. At the same time, the different sections of the universal shoe are adjustably connected together in such a manner that the stream line air flow will meet with little friction, the construction, according to this invention, eliminating friction and thereby increasing the velocity of the air to a great extent. It is to be understood that substitutions and alterations may be made in the above disclosure, both in the specification and drawings within the scope of the appended claim without effecting the merits of this invention.

What I claim is:

An adjustable elbow for pipes comprising an intermediate section and end sections, one end of said intermediate section and the adjacent end of one end section being rectangular and provided, the one with a flange removably telescoping upon a similar flange of the other, whereby the flanged ends may be relatively reversed, said intermediate section and said flanged end section having disassemblable adjusting means by which the telescopic flanges may be drawn together or the adjusting means disassembled for reversing the relation of said sections.

In testimony whereof I affix my signature.

SAMUEL PAUL BURGESS.